United States Patent [19]

Kim et al.

[11] Patent Number: 5,556,816

[45] Date of Patent: Sep. 17, 1996

[54] METHODS FOR PREPARATION OF TETRAGONAL ZIRCONIA POLYCRYSTAL COMPOSITES

[76] Inventors: Dae-Joon Kim, Kwangjang Apt. 2-702, Yoido-Dong, Yongdungpo-Ku; Ju-Woong Jang, Shindonga Apt. 4-307, Bon-Dong, Dongjak-Ku; Hyung-Jin Jung, 208-22, Kungjeon Villa Na-102, Kueui-Dong, Sungdong-Ku, all of Seoul, Rep. of Korea

[21] Appl. No.: 398,618

[22] Filed: Mar. 1, 1995

[30] Foreign Application Priority Data

Mar. 15, 1994 [KR] Rep. of Korea ............ 5128/1994

[51] Int. Cl.$^6$ .................................. C04B 35/48
[52] U.S. Cl. .................... 501/103; 501/126; 501/152
[58] Field of Search .................... 501/103, 126, 501/152

[56] References Cited

U.S. PATENT DOCUMENTS

| | | | |
|---|---|---|---|
| 4,360,598 | 11/1982 | Otagiri et al. | 501/103 |
| 4,370,393 | 1/1983 | Watanabe et al. | 501/103 |
| 4,507,394 | 3/1985 | Mase et al. | 501/103 |
| 4,525,464 | 6/1985 | Claussen et al. | 501/103 |
| 4,748,138 | 5/1988 | Watanabe et al. | 501/103 |
| 4,886,768 | 12/1989 | Tien | 501/104 |
| 5,008,221 | 4/1991 | Ketcham | 501/103 |

*Primary Examiner*—Karl Group
*Assistant Examiner*—Michael Marcheschi
*Attorney, Agent, or Firm*—Townsend and Townsend and Crew LLP

[57] ABSTRACT

A method for the preparation of tetragonal zirconia polycrystal composite with high toughness and low-temperature degradation resistance. The method comprising adding transformable TZP of $ZrO_2$—$Y_2O_3$—$Nb_2O_5/Ta_2O_5$ system to non-transformable TZP of $ZrO_2$—$Y_2O_3$—$Nb_2O_5/Ta_2O_5$ system in an amount of not more than 60% by weight based on the total weight of the resulting mixture; and sintering the mixture at above 1,500° C. Even though being exposed to a temperature ranging from 100° to 400° C. for a long time in air, the TZP composite prepared by the present method is rarely transformed into monoclinic zirconia and yet exhibits high toughness.

3 Claims, 1 Drawing Sheet

METHODS FOR PREPARATION OF TETRAGONAL ZIRCONIA POLYCRYSTAL COMPOSITES

BACKGROUND OF THE INVENTION

1. Field of the Invention

The present invention relates, in general, to a method for the preparation of tetragonal zirconia polycrystal composite and, more particularly, to a method for preparing a tetragonal zirconia polycrystal composite, capable of allowing the composite to resist low-temperature degradation yet to have high toughness.

2. Description of the Prior Art

Generally, zirconia exists in three allotropic forms: monoclinic, tetragonal and cubic and there is a large volume expansion during the phase transformation from tetragonal to monoclinic which occurs when tetragonal zirconia polycrystal (hereinafter referred to as "TZP") having high toughness and strength is exposed to a low temperature range of 100° to 400° C. for a long time in air. This phase transformation is accompanied by the generation of fine-scale cracks on the material surface. As a result, the strength becomes significantly decreased, which is a phenomenon called low-temperature degradation.

In order to secure reliability of a TZP material at low or high temperature, there is a need for a technology to effectively suppress or disrupt the low-temperature degradation. Recently, based on the need, several control processes for low-temperature degradation of TZP have been suggested.

Representative examples of existing control processes for low-temperature degradation of TZP include an increase of the amount of $Y_2O_3$ content and a decrease in the average particle diameter of sintered bodies by lowering sintering temperature.

However, these conventional control processes for low-temperature degradation of TZP include such a problem that the resulted zirconia gets low toughness because they incapacitate the phase transformation to monoclinic, which leads to difficulty in stress-induced phase transformation, a toughening mechanism.

A representative for yttria (yttrium oxide, $Y_2O_3$)-stabilized zirconia, commercially available, is 3Y-TZP, which comprises 3 mol % of yttria. The zirconia having such composition is known to not only show high toughness due to a high content, e.g. more than 90 %, of tetragonal phase but also exhibits superior strength because of a small average grain size, e.g. less than 0.5 µm, of sintered bodies.

There is disclosed an improvement in toughness of TZP in U.S. Pat. No. 4,886,768 wherein a pentavalent oxide is used as a toughening agent. This patent says that the presence of 1.5 mol % or more of the pentavalent oxide such as $Ta_2O_5$ or $Nb_2O_5$ results in an increase in toughness of the order of a three-fold increase in fracture toughness relative to the absence thereof.

For all noticeable influence of low-temperature degradation on the reliability of substance in practical application of TZP, however, there is no mention thereabout in U.S. Pat. No. 4,886,768. The present inventors have tested the 3Y-TZP of this patent and found that it has a serious problem of low-temperature degradation.

Consequently, the addition of $Nb_2O_5$ increases toughness according to U.S. Pat. No. 4,886,768 but yet effects degradation under the condition of low temperature treatment, thereby resulting in bad reliability of the material U.S. Pat. No. 4,507,394 discloses that ceramics comprising a composition consisting essentially of $ZrO_2$ and/or $HfO_2$ added with 5 to 30 mol % of $Y_2O_3$ and 5 to 40 mol % of $Nb_2O_5$ or $Ta_2O_5$ exhibit high electrical resistivity and mechanical strength. However, the toughness measurements of any of the ceramics having such composition is nowhere to be found in this patent. In addition, although it is claimed that the ceramics described by the patent have high strength, the highest strength measured for these materials is lower than those of other well-known TZP materials. Further, there is no description in this patent in conjunction with the preparation of a ceramic composite body high in toughness and resistant to low-temperature degradation by use of the composition.

U.S. Pat. No. 5,008,221 describes ceramic alloys comprising a mixture of a composition of $Y_2O_3$-stabilized TZP exhibiting high toughness through the inclusion of 0.5–8 mol % of $YNbO_4$ or $YTaO_4$, and ceramics containing such alloys as a toughening agent. In detail, the three-component system of $ZrO_2$—$Y_2O_3$—$Nb_2O_5$ described is satisfied by a polygon O(4.85, 0.35), P(7.00, 2.50), Q(6.80, 2.50), R(7.80, 3.50), S(7.50, 3.50), T(8.00, 4.00), U(s4.40, 4.00), V(3.40, 3.00), W(3.50, 3.00), X(2.75, 2.25), Y(3.25, 2.25), Z(1.35, 0.35) of (mole % of $Y_2O_3$, mole % of $Nb_2O_5$) enclosing the composition region of the patent. Examples of ceramic matrices with which the ceramic alloys in the composition region of the polygon form the ceramic composite body include α-alumina, β-alumina, $Al_2O_3$—$Cr_2O_3$ solid solutions, mullite, sialon, nasicon, silicon carbide, silicon nitride, spinel, titanium carbide, titanium diboride, zircon, and zirconium carbide.

Meanwhile, a composition comprising 2 to 4 mol % of $Y_2O_3$ and 0.5 to 3.0 mol % of $Nb_2O_5$ or $Ta_2O_5$, as claimed in the supra patent, is the same with that of previously mentioned U.S. Pat. No. 4,886,768. In addition, prevention of low-temperature degradation of the zirconia and the composite body claimed is mentioned nowhere in U.S. Pat. No. 5,008,221.

A test for low-temperature degradation was carried out for the ceramic compositions of U.S. Pat. No. 5,008,221 by the present inventors. In the test, significantly high toughness ceramic compositions selected from the $ZrO_2$—$Y_2O_3$—$Nb_2O_5$ systems suggested by U.S. Pat. No. 5,008,221 were sintered at 1,550° C. for 2 hours and then, subjected to heat treatment at 220° C. for 120 hours in air. Results of the test are given as shown in the following Table 1. In this table, sample numbers are the same with those of the patent.

TABLE 1

Results for Low-temperature degradation After Heat Treatment at 220° C. for 120 hours in air.

| Sample No. | mole % $ZrO_2$ | mole % $YO_{3/2}$ | mole % $YNbO_4$ | phase after sintering | % m-$ZrO_2$ after aging |
|---|---|---|---|---|---|
| 1 | 96.10 | 3.90 | 0.00 | t | 96 |
| 2 | 94.20 | 5.80 | 0.00 | t | 66 |
| 3 | 93.95 | 5.80 | 0.25 | t + c | 67 |
| 4 | 92.94 | 5.60 | 1.26 | t + c | 58 |
| 5 | 89.25 | 5.50 | 5.25 | c + t | 16 |
| 6 | 80.70 | 5.00 | 14.30 | t + c | 0 |
| 7 | 62.40 | 3.80 | 33.80 | * | ♦ |
| 8 | 94.20 | 3.80 | 2.00 | t | 86 |
| 9 | 92.30 | 5.70 | 2.00 | t + c | 65 |
| 10 | 91.30 | 5.60 | 3.10 | t + c | 63 |
| 11 | 94.00 | 2.90 | 3.10 | t + m | ♦ |

TABLE 1-continued

Results for Low-temperature degradation After Heat Treatment at 220° C. for 120 hours in air.

| Sample No. | mole % $ZrO_2$ | mole % $YO_{3/2}$ | mole % $YNbO_4$ | phase after sintering | % m-$ZrO_2$ after aging |
|---|---|---|---|---|---|
| 12 | 93.10 | 3.80 | 3.10 | t | 86 |
| 13 | 93.20 | 4.80 | 2.00 | t + c | 74 |
| 14 | 92.20 | 4.70 | 3.10 | t + c | 76 |
| 15 | 91.40 | 6.60 | 2.00 | t + c | 53 |
| 24 | 91.70 | 1.90 | 6.40 | t | 84 |
| 25 | 92.00 | 3.80 | 4.20 | t + c | ♦ |
| 26 | 91.00 | 3.70 | 5.30 | t + c | ♦ |
| 43 | 96.10 | 2.90 | 1.00 | m + t | 96 |
| 44 | 95.10 | 3.90 | 1.00 | t | 77 | note: m: m-$ZrO_2$, t: t-$ZrO_2$, c: c-$ZrO_2$, *: non-sinterable, ♦:cracking

From Table 1, it is apparent that all t-$ZrO_2$ except the sample #6 comprising high toughness compositions claimed in the patent transforms into m-$ZrO_2$ under low temperatures with low-temperature degradation occurring. It should be noted that the sample #6 does not consist of t-$ZrO_2$ only but a phase mixture of t-$ZrO_2$ and c-$ZrO_2$.

In the meanwhile, the present inventors observed that sintering at 1,500° C. for 1 hour allows 3Y-TZP samples comprising 1.5 mol % of $Nb_2O_5$ to exhibit tetragonal phase but 3Y-TZP samples comprising more than 1.5 mol % of $Nb_2O_5$ to display both tetragonal and monoclinic phases because of instability of tetragonal phase. From this observation, it is recognized that 1.5% by mole is the amount of $Nb_2O_5$ which is optimal to raise the toughness.

SUMMARY OF THE INVENTION

The present invention is designed in consideration of the problems which the conventional TZP compositions have and on the basis of the influence of pentavalent oxide on both the toughness and the low-temperature degradation of 3Y-TZP. Therefore, an object of the present invention is to overcome the above problems encountered in prior arts and to provide a preparation method for a tetragonal zirconia polycrystal composite which is capable of stabilizing the 3Y-TZP added with 1.5% by mole of $Nb_2O_5$, the highest toughness composition, under low-temperature degradation condition so as for the composite not to be transformed into monoclinic zirconia polycrystal yet allowing the composite to have the toughness almost equal to that of the conventional 3Y-TZP.

The characteristic feature of the process of the present invention is mixing transformable TZP and non-transformable TZP to obtain a composite thereof. That is, based on the intensive and thorough study by the present inventors, the above object could be accomplished by a provision of a method for the preparation of a tetragonal zirconia polycrystal composite with high toughness and low-temperature degradation resistance, comprising the steps of: moving 40 to 85 wt. percent of a non-transformable TZP composition consisting of 84–91 mol % of $ZrO_2$, 5–8 mol % of $Y_2O_3$ and 4–8 mol % of $Nb_2O_5$ or $Ta_2O_5$ with a transformable TZP composition consisting of 93–97 mol % $ZrO_2$, 2–4 mol % of $Y_2O_3$ and 1–3 mol % of $Nb_2O_5$ or $Ta_2O_5$ in an amount of 15 to 60 % by weight on the basis of the total weight of the mixture wherein the $Y_2O_3$ being present in more amount than $Nb_2O_5$ or $Ta_2O_5$ in both the transformable TZP and non-transformable TZP; and sintering the resulting mixture.

In another aspect of the present invention, there is provided a method for the preparation of tetragonal zirconia polycrystal composite with high toughness and low-temperature degradation resistance, comprising the steps of: adding a non transformable TZP composition consisting of 82–86 mol % of $ZrO_2$, 7–9 mol % of $Y_2O_3$ and 7–9 mol % of $Nb_2O_5$ or $Ta_2O_5$ with a transformable TZP composition consisting of 93–97 mol % of $ZrO_2$, 2–4 mol % of $Y_2O_3$ and 1–3 mol % of $Nb_2O_5$ or $Ta_2O_5$ in an amount of 15 to 60% by weight on the basis of the total weight of the mixture wherein the $Y_2O_3$ being present in greater amount than said $Nb_2O_5$ or $Ta_2O_5$ in the transformable TZP and being present in the same amount as $Nb_2O_5$ or $Ta_2O_5$ in the non-transformable TZP; and sintering the resulting mixture.

BRIEF DESCRIPTION OF THE DRAWINGS

The above and other objects, features and advantages of the present invention will be more apparent from the following detailed description taken with reference to the accompanying drawings, in which.

DETAILED DESCRIPTION OF THE INVENTION

In $ZrO_2$—$Y_2O_3$—$Nb_2O_5$ system, there are two kinds of TZP solid solutions: one is a transformable TZP, which is readily transformed into monoclinic phase by heat treatment for a long time at low temperature or by external stress; and the other is a non-transformable TZP, which is rarely transformed into monoclinic phase under such conditions.

Of the transformable TZP, a composition comprising 3Y-TZP (3 mol % of yttria) added with not more than 2 mol % of $Nb_2O_5$ or comprising 4Y-TZP (4 mol % of yttria) added with not more than 3 mol % of $Nb_2O_5$ can permit the tetragonal phase to be present in metastable phase at room temperature. The non-transformable TZP displays a single phase in a composition range of from 86 mole % $ZrO_2$-14 mole % $YNbO_4$ to 83 mole % $ZrO_2$-17 mole % $YNbO_4$. Other non-transformable compositions are given as shown in the following Table 2.

TABLE 2

Non-transformable TZP Composition Range in $ZrO_2$—$Y_2O_3$—$Nb_2O_5$ System

| mole % $ZrO_2$ | mole % $Y_2O_3$ | mole % $Nb_2O_5$ |
|---|---|---|
| 90.50 | 5.25 | 4.25 |
| 90.00 | 5.50 | 4.50 |
| 89.75 | 5.50 | 4.75 |
| 89.50 | 5.75 | 4.75 |
| 89.25 | 5.75 | 5.00 |
| 89.00 | 6.00 | 5.00 |
| 89.00 | 5.75 | 5.25 |
| 88.50 | 6.00 | 5.50 |
| 84.00 | 8.00 | 8.00 |

Transformable and non-transformable TZP compositions in $ZrO_2$—$Y_2O_3$—$Ta_2O_5$ system can refer to literature, e.g. J. Am. Ceram. Soc. Vol 74[12]3061–3065 (1991).

In accordance with the present invention, a composite body is prepared by mixing the transformable TZP with the non-transformable TZP and sintering the mixture at above 1,500° C.

Figure 1:
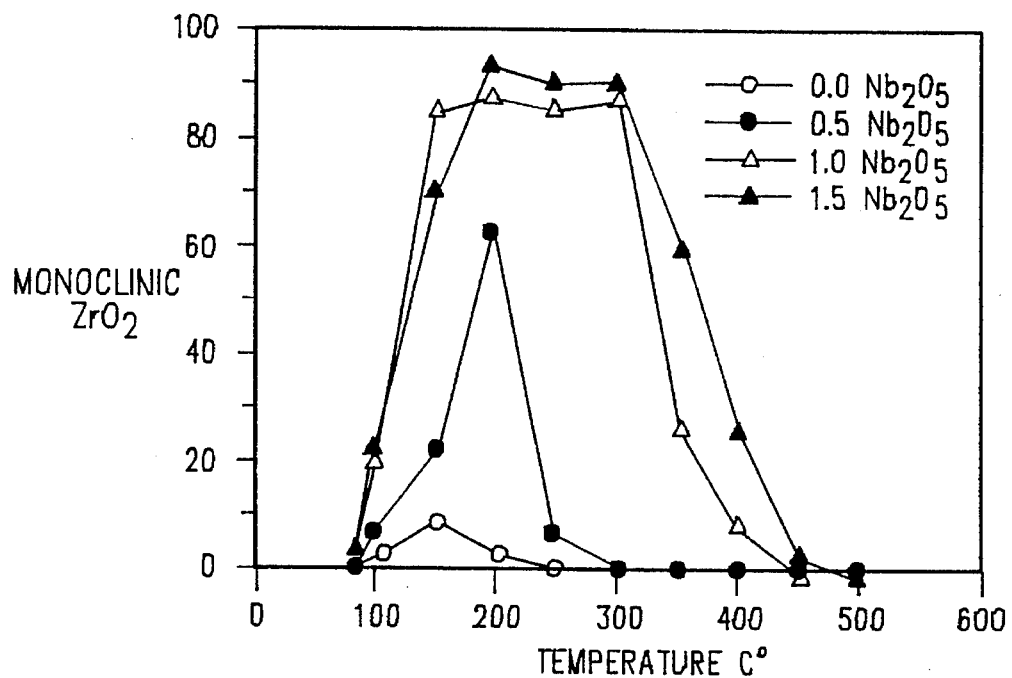
FIG. 1 is a graph illustrating the influence of $Nb_2O_5$ on the low-temperature degradation of 3 mole % $Y_2O_3$-stabilized zirconia.

Referring now to FIG. 1, there are shown variations of phase transformation properties depending on the amount of $Nb_2O_5$. From this figure, where each of the samples comprising 3Y-TZP of various amounts, e.g. 0.5, 1.0 and 1.5% by mole of $Nb_2O_5$ is subject to thermal treatment in air at 250° C. for 100 hours, it is recognized that, the more $Nb_2O_5$ is added, the larger the transformation amount of tetragonal zirconia polycrystal to monoclinic zirconia polycrystal. Consequently, since the transformation amount to monoclinic zirconia polycrystal reflects the extent of low-temperature degradation, the addition of $Nb_2O_5$ demonstrates promotion of low-temperature degradation.

In the graph of FIG. 1, the transformation amount to monoclinic zirconia polycrystal is obtained from X-ray diffraction. In detail, it is determined by dividing the sum of monoclinic phase peak intensities by the sum of the tetragonal phase peak intensity and monoclinic phase peak intensities. As illustrated in FIG. 1, 3Y-TZP added with 1.5 mol % of $Nb_2O_5$ results in deterioration in low-temperature degradation of the order of a ten-fold decrease relative to the absence of $Nb_2O_5$.

According to one aspect of the present invention, there is provided a composite composition comprising a mixture of a non-transformable TZP consisting of 84–91 mol % of $ZrO_2$, 5–8 mol % of $Y_2)_3$ and 4–8 mol % of $Nb_2O_5$ or $Ta_2O_5$, and a transformable TZP consisting of 93–97 mol % of $ZrO_2$, 2–4 mol % of $Y_2O_3$ and 1–3 mol % of $Nb_2O_5$ or $Ta_2O_5$ with the amount of said transformable TZP being in an amount of 15 to 60% by weight on the basis of the total weight of the mixture, wherein said $Y_2O_3$ being present in greater amount than $Nb_2O_5$ or $Ta_2O_5$ in both said transformable TZP and non-transformable TZP.

According to another aspect of the present invention, there is provided a composition Comprising a mixture of a non transformable TZP consisting of 82–86 mol % of $ZrO_2$, 7–9 mol % of $Y_2O_3$ and 7–9 mol % of $Nb_2O_5$ or $Ta_2O_5$, and a transformable TZP consisting of 93–97 mol % of $ZrO_2$, 2–4 mol % of $Y_2O_3$ and 1–3 mol % of $Nb_2O_5$ or $Ta_2O_5$ with the amount of said transformable TZP being in an amount of 15 to 60% by weight on the basis of the total weight of the mixture, wherein said $Y_2O_3$ is present in greater amount than said $Nb_2O_5$ or $Ta_2O_5$ in said transformable TZP and is present in the same amount as $Nb_2O_5$ or $Ta_2O_5$ in the non-transformable TZP.

$Y_2O_3$ employed in both the transformable and the non-transformable TZPs may be substituted by one selected from a group consisting of $La_2O_3$, $CeO_2$, $Nd_2O_3$, $Sm_2O_3$, $Tb_2O_3$, $Dy_2O_3$, $Ho_2O_3$, $Er_2O_3$, $Tm_2O_3$, $Yb_2O_3$ and $Lu_2O_3$.

The non-transformable TZP of the present invention may further comprise 1–9% by mole of one selected from a group consisting of CaO, MgO, $GeO_2$ and $SnO_2$.

In addition, a composite body of the present invention may further contain 20–80 mol % of $Al_2O_3$.

Even though being exposed to a temperature ranging from 100° to 400° C. for a long time in air, the TZP composite prepared by the present method is rarely transformed into monoclinic zirconia and yet exhibits high toughness.

Mechanism for such prevention of low-temperature degradation is considered as follows: the non-transformable TZP in the present composite is expected to play an important role in restraining lattice relaxation, which is regarded as a condition necessary for phase transformation of the transformable TZP to monoclinic phase, thereby controlling the low-temperature degradation of the transformable TZP.

Oxides utterly different from zirconia, such as alumina, are expected to be lattice-relaxation suppressors but cannot contribute as much as the non-transformable TZP because there are discontinuities of various physical properties in the interface between alumina and zirconia, based on considerable differences of thermal expansion coefficient.

The preferred embodiments of the present invention will now be further described with reference to the following specific examples.

In the following examples, toughness values ($K_{IC}$) were determined by the following formula suggested by Charles and Evans:

$$K_{IC} = 0.203 \cdot (c/a)^{3/2} \cdot H \cdot a^{1/2}$$

wherein a is a half distance of an indent diagonal which results from the impression of Vickers indent on a sample, c is the crack length from the center of indent, and H is hardness.

EXAMPLE 1

A non-transformable TZP composition comprising 89.5 mol % of $ZrO_2$, 5.75 mol % of $Y_2O_3$ and 4.75 mol % of $Nb_2O_5$ and a transformable TZP composition comprising 3Y-TZP and 1.5 mol % of $Nb_2O_5$ (hereinafter referred to "3Y-1.5Nb-TZP") were prepared separately, by calcinating each composition at 1300° C. for 2 hours. To the said non-transformable TZP, 15 wt % of the said 3Y-1.5Nb-TZP was added based on the total weight of the resulting mixture, and then subjected to sintering at 1,550° C. for 10 hours, to give a sample. The sample exhibited a fracture toughness of 9 MPa m$^{1/2}$ and, after heat treatment at 250° C. for 1,000 hours in air, there was no transformation to monoclinic phase in the sample, which demonstrated no low-temperature degradation.

To the contrary, in a sample prepared with a 3Y-1.5Nb-TZP single phase, after heat treatment at 250° C. for only 100 hours in air, TZP was transformed into monoclinic phase in an amount of above 90%, as shown in FIG. 1, from which it was recognized that there occurred as much low-temperature degradation.

In the following Table 3, there are summarized fracture toughnesses of and low-temperature degradation of TZP composites, comprising non-transformable TZP and transformable TZP, depending on their mixing ratio and sintering time. By reference, an ordinary sample of 3Y-TZP exhibited a fracture toughness of about 6.0 MPa·m$^{1/2}$ after sintering at 1,550° C. for 10 hours and this sintered body showed low-temperature degradation in a degree of 67% when treated at 250° C. for 120 hours in air.

TABLE 3

Fracture Toughness and Low-Temperature degradation of TZP Composite consisting of Non-Transformable TZP and transformable TZP Depending on their mixing ratio

| wt % Non-Transformable TZP[1] | wt % 3Y—1.5Nb—TZP[2] | MPA · m$^{1/2}$ Toughness | | | % Low-Temp. degradation[3] | | |
|---|---|---|---|---|---|---|---|
| | | 2 h[4] | 5 h[4] | 10 h[4] | 2 h[4] | 5 h[4] | 10 h[4] |
| 85 | 15 | 4.5 | 5.6 | 9.0 | 0.0 | 0.0 | 0.0 |
| 80 | 20 | 4.5 | 6.0 | 11.2 | 0.0 | 0.7 | 1.0 |
| 75 | 25 | 4.3 | 7.5 | 11.4 | 0.8 | 4.0 | 5.0 |
| 70 | 30 | 4.6 | 10.3 | 15.3 | 1.0 | 4.0 | 71.0 |

TABLE 3-continued

Fracture Toughness and Low-Temperature degradation of TZP Composite consisting of Non-Transformable TZP and transformable TZP Depending on their mixing ratio

| wt % Non-Transformable TZP[1] | wt % 3Y—1.5Nb—TZP[2] | MPA·m$^{1/2}$ Toughness | | | % Low-Temp. degradation[3] | | |
|---|---|---|---|---|---|---|---|
| | | 2 h[4] | 5 h[4] | 10 h[4] | 2 h[4] | 5 h[4] | 10 h[4] |

[1]89.5 mole % $ZrO_2$-5.75 mole % $Y_2O_3$-4.75 mole % $Nb_2O_5$
[2]95.5 mole % $ZrO_2$-3.00 mole % $Y_2O_3$-1.50 mole % $Nb_2O_5$
[3]transformation amount(%) to monoclinic after heat treatment at 250° C. for 1000 h in air
[4]sintering time at 1,550° C.

A sample was prepared by adding a non-transformable TZP consisting of 89.75% by mole of $ZrO_2$, 5.75% by mole of $Y_2O_3$ and 4.5% by mole of $Nb_2O_5$ with 3Y-1.5Nb-TZP in an amount of 15% by weight and sintering the mixture at 1,550° C. for 10 hours. The sintered body exhibited a fracture toughness of 10 MPa·m$^{1/2}$, and there was no transformation to monoclinic phase after heat treatment at 150° C. for 100 hours in air, which testified no heat treatment at 250° C. for 100 hours in air, which testified no low-temperature degradation under such condition.

EXAMPLE 3

A sample was prepared by adding a non-transformable TZP consisting of 85 mol % of $ZrO_2$, 7.5 mol % of $Y_2O_3$ and 7.5 mol % of $Ta_2O_5$ with a transformable TZP consisting of 93 mol % of $ZrO_2$, 4 mol % of $Y_2O_3$ and 3 mol % of $Nb_2O_5$ in an amount of 36 to 60% by weight and sintering the mixture at 1,550° C. for 2 hours. The sintered body exhibited a fracture toughness of 6 to 7 MPa·m$^{1/2}$, and there was no transformation to monoclinic phase after heat treatment at 250° C. for 120 hours in air.

EXAMPLE 4

A sample was prepared by adding a non-transformable TZP consisting of 84 mol % of $ZrO_2$, 8 mol % of $Y_2O_3$ and 8 mol % of $Nb_2O_5$ with 3Y-1.5Nb-TZP in an amount of 50 to 60% by weight and sintering the mixture at 1,550° C. for 2 hours. The sintered body exhibited a fracture toughness of 7 MPa·m$^{1/2}$, and there was no transformation to monoclinic phase after heat treatment at 250° C. for 120 hours in air.

EXAMPLE 5

To get rid of such possible misunderstandings that the non-transformable/transformable TZP composites of Examples 1 to 4 might not exhibit not the properties of the composites themselves but the properties of the TZPs containing the gross compositions of the composites, a TZP composite containing 20% by weight of 3Y-1.5Nb-TZP in Table 3 and a monolith comprising the gross composition of the composite, that is, 90.75% by mole of $ZrO_2$, 5.16% by mole of $Y_2O_3$ and 4.09% by mole of $Nb_2O_5$, were subjected to sintering at 1,550° C. for 2, 5, and 10 hours, respectively.

Figure 2:
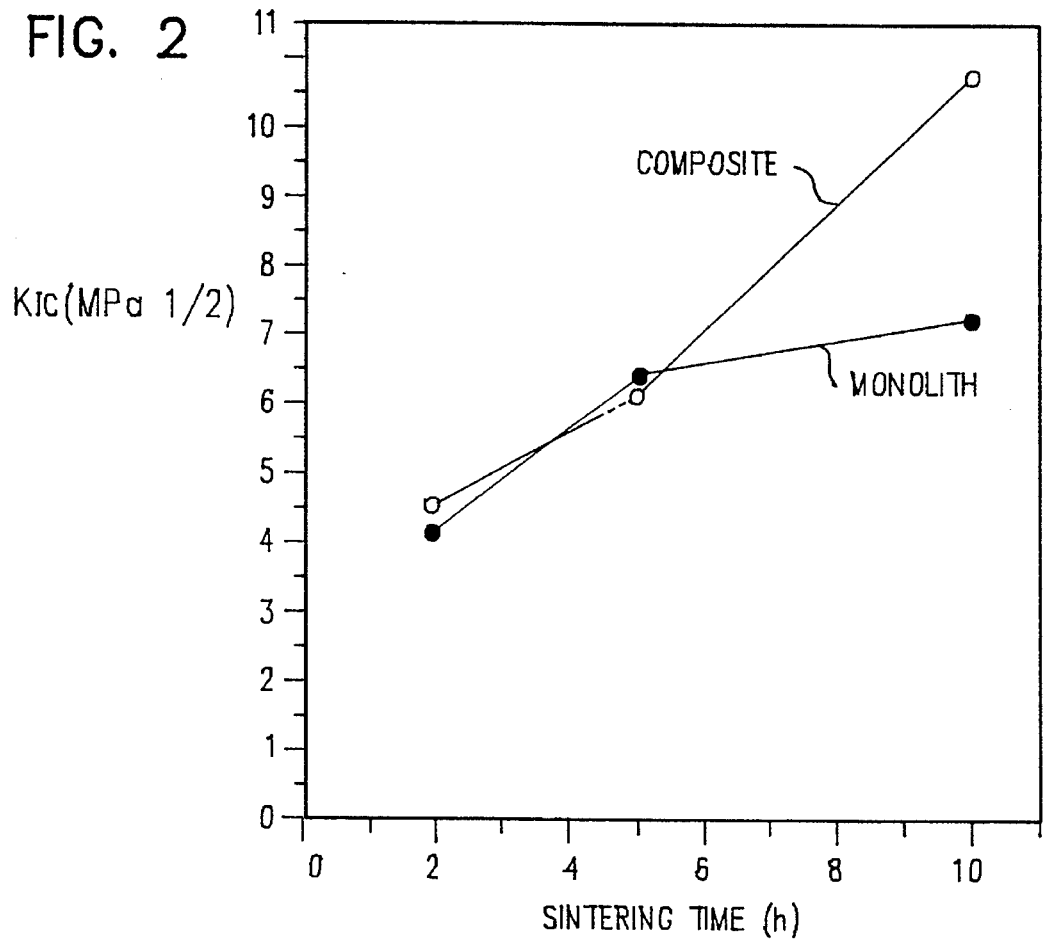
FIG. 2 is a graph illustrating the changes of fracture toughness with regard to sintering time in the TZP composite according to the present invention and in a monolith comprising the gross composition of the composite.

The fracture toughnesses of the two sintered bodies were measured and are depicted in FIG. 2. As shown in this figure, the TZP composite shows increased fracture toughness with the lapse of the sintering time, which is attributed to a fact that the transformable TZP becomes larger in grain size as the sintering time is longer, resulting in ready transformation to monoclinic phase. However, since, in the monolith comprising the gross composition, there is no mechanism for increasing fracture toughness through such phase transformation, its fracture toughness is not largely increased with the sintering time relative to that of the composite in spite of large grain size. Therefore, it is demonstrated that the properties described in Examples 1 to 4 attribute to the composites.

Other features, advantages and embodiments of the present invention disclosed herein will be readily apparent to those exercising ordinary skill in the art after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for the preparation of tetragonal zirconia polycrystal composite with high toughness and low-temperature degradation resistance, comprising the steps of:

adding 40 to 85 wt % of a non-transformable TZP composition with 15 to 60 wt % of transformable TZP composition to form a mixture; and sintering the resulting mixture at 1550° C.

2. The method according to claim 1 wherein the non-transformable TZP composition consists of 84–91 mol % of $ZrO_2$, 5–8 mol % of $Y_2O_3$ and 4–8 mol % of $Nb_2O_5$ or $Ta_2O_5$ and the transformable TZP composition consists of 93–97 mol % of $ZrO_2$, 2–4 mol % of $Y_2O_3$ and 1–3 mol % of $Nb_2O_5$ or $Ta_2O_5$, with said $Y_2O_3$ being present in greater amount than $Nb_2O_5$ or $Ta_2O_5$ in both said non-transformable TZP and transformable TZP compositions.

3. The method according to claim 1 wherein the non-transformable TZP composition consists of 82–86 mol % of $ZrO_2$, 7–9 mol % of $Y_2O_3$ and 7–9 mol % of $Nb_2O_5$ or $Ta_2O_5$ and the transformable TZP composition consists of 93–97 mol % of $ZrO_2$, 2–4 mol % of $Y_2O_3$ and 1–3 mol % of $Nb_2O_5$ or $Ta_2O_5$ with said $Y_2O_3$ being present in greater amount than said $Nb_2O_5$ or $Ta_2O_5$ in the transformable TZP composition and being present in the same amount as $Nb_2O_5$ or $Ta_2O_5$ in the non-transformable TZP composition.

* * * * *